United States Patent
Broberg, III et al.

(10) Patent No.: US 7,584,460 B2
(45) Date of Patent: Sep. 1, 2009

(54) PROCESS AND APPARATUS FOR ABSTRACTING IC DESIGN FILES

(75) Inventors: Robert N. C. Broberg, III, Rochester, MN (US); John C. Reddersen, Rochester, MN (US); Judy M. Gehman, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 867 days.

(21) Appl. No.: 10/724,851

(22) Filed: Dec. 1, 2003

(65) Prior Publication Data

US 2005/0022155 A1    Jan. 27, 2005

Related U.S. Application Data

(60) Provisional application No. 60/489,339, filed on Jul. 22, 2003, provisional application No. 60/502,592, filed on Sep. 12, 2003.

(51) Int. Cl.
  *G06F 9/44*    (2006.01)
  *G06F 9/45*    (2006.01)
  *G06F 17/50*   (2006.01)

(52) U.S. Cl. .................. 717/143; 717/123; 717/137; 716/3; 716/5; 716/16; 716/18

(58) Field of Classification Search ............... 717/114, 717/123
  See application file for complete search history.

(56) References Cited

U.S. PATENT DOCUMENTS

| | | | | |
|---|---|---|---|---|
| 5,491,640 | A | * | 2/1996 | Sharma et al. ............... 716/18 |
| 5,812,416 | A | * | 9/1998 | Gupte et al. ................... 716/2 |
| 5,841,663 | A | * | 11/1998 | Sharma et al. ............... 716/18 |
| 6,061,819 | A | * | 5/2000 | Bening et al. ............... 714/741 |
| 6,606,734 | B2 | * | 8/2003 | Greaves ........................ 716/4 |
| 6,760,888 | B2 | * | 7/2004 | Killian et al. ................. 716/1 |
| 6,823,497 | B2 | * | 11/2004 | Schubert et al. ............... 716/4 |
| 6,951,017 | B1 | * | 9/2005 | Dalton ........................ 717/170 |
| 2002/0188922 | A1 | * | 12/2002 | Ginneken et al. ............. 716/18 |
| 2003/0145286 | A1 | * | 7/2003 | Pajak et al. .................... 716/1 |

* cited by examiner

*Primary Examiner*—Tuan Q Dam
*Assistant Examiner*—Isaac T Tecklu
(74) *Attorney, Agent, or Firm*—William W. Cochran; Cochran Freund & Young LLC

(57) ABSTRACT

File paths for a plurality of IC design files in a hardware description language are abstracted by parsing description files, or a directory of description file names, to identify file paths to each of the plurality of design files in a first environment. An index is generated correlating each design file and its respective file path.

In use, a file path in a second environment of an application is defined for each design file, and the index is applied to the file paths in the second environment to define full file paths for each design file through the first and second environments. The design files are then applied to the application using the full file paths.

5 Claims, 9 Drawing Sheets

```
$LSI_RW/tool/shared/lib/rmk/
                |_RapidMake.functions
                |_RapidMake.parser
                |_RapidMake.targets
                |_RapidMake.vcs $LSI_RS/RapidSlice_1810_1_0/

$LSI_RRCW/cw123456_ex_1_0/
                |_prod/
                       |_cw123456_ex_1_0.rmk
                       |_rmk/
                       |     |_default_rsp
                       |_sim/
                             |_rtlprot/
                                       |_verilog/
                                                 |_modelsim/
                                                 |          |_5.7/
                                                 |                |_cw123456_ex_1_0.vp
                                                 |_vcs/
                                                      |_6.2/
                                                            |_cw123456_ex_1_0.vp
```

FIG. 6

```
#Load Base RapidMake functions
#Location of the RapidMake library
RMK_HOME_DIR = ${LSI_RW}/tool/shared/lib/rmk

#Locate and include the makefile containing the base RapidMake
#functions
RMK_BASEFUNCTIONS_FILE = $(RMK_HOME_DIR)/RapidMake.functions
include $(RMK_BASEFUNCTIONS_FILE)

#RapidMake Configuration:
#Location of the RapidSlice
RMK_SLICE_DIR   := ${LSI_RS}/RapidSlice_1810_1_0

#List of directories to search for other RapidMake files:
RMK_RAPIDMAKE_SEARCH_DIRS := ${LSI_RI}/rmk $(LSI_RI}/rwo/rmk \
      $(RMK_SLICE_DIR}/rmk $(RMK_HOME_DIR)

#Location of the makefile containing the base RapidMake targets
RMK_TARGETS_FILE := $(call find_file,RapidMake.targets, \
      $(RMK_RAPIDMAKE_SEARCH_DIRS))

#Location of the RapidMake.rmk parser makefile:
RMK_PARSER_FILE := $(call find_file,RapidMake.parser, \
      $(RMK_RAPIDMAKE_SEARCH_DIRS))

#Location to write autogenerated.rmk index:
RMK_INDEX_FILE   :=   ${LSI_RI}/rmk/RapidMake.rmkindex

#Location of user overrides to autogenerated.rmk index:
RMK_INDEX_OVERRIDES_FILE := ${LSI_RI}/rmk/RapidMake.overrides

#List of directories to search recursively for .rmk files
RMK_INDEX_SEARCH_DIRS :=   ${LSI_RI} $(RMK_SLICE_DIR) ${LSI_RRCW}

#Tool Configuration
#Simulation
RMKSIM_LANGUAGE := verilog
RMK_SIM_TOOL       := modelsim
RMK_SIM_TOOL_VERSION    := 5.7
RMK_SIM_RAPIDMAKE_FILE  = (call find_file,RapidMake.$(RMK_SIM_TOOL), \
      $(RMK_RAPIDMAKE_SEARCH_DIRS))

#Define common shell utilities
RM    = rm -f
CP    = cp
#Defined so that the recursive make calls do not print directory info
MAKE = gmake --no-print-directory -r -R

#Boilerplate (user does not modify)
#Include autogenerated.rmk file index.
include $(RMK_INDEX_FILE)

#Include RapidMake base targets
include $(RMK_TARGETS_FILE)
```

FIG. 8

```
#Name of this module which will be used by other .rmk or routines in
#the RapidMake.functions to build the list of files.
RMK_MOD_NAME := CW123456_EX_1_0

#List of submodules used by this module by using the submodules module
#name. Do not include path names.
$(RMK_MOD_NAME)_SUB_MODS :=

#List of RTL files used in this module.  The path from the .rmk file
location to the verilog file must be included.
$(RMK_MOD_NAME)_RTL_FILES := VLOG|sim/rtlprot/${RMK_SIM_LANGUAGE}/
      {RMK_SIM_TOOL}/${RMK_SIM_TOOL_VERSION}/cw123456_ex_1_0.vp

#Include the file to set up RapidMake Search Paths for this module.
include $($(RMK_MOD_NAME)_RMK_DIR)/rmk/default.rsp

###Boilerplate - DO NOT MODIFY
$ (RMK_MOD_NAME)_RMK_VERSION := 1.00
include $(RMK_PARSER_FILE)
```

FIG. 9 cw123456_ex_1_0.rmk FILE

```
#Name of this module.  This is used by other .rmk or routines in the
#RapidMake.functions to build the list of files.
RMK_MOD_NAME := UCMTOP

#List of submodules used by this module by using the submodules module
#name.
$(RMK_MOD_NAME)_SUB_MODS := CW123456_EX_1_0

#List of RTL files used in this module including the path from the .rmk
#file location to the verilog file.
$(RMK_MOD_NAME)_RTL_FILES := VLOG|UcmBlock.v\
                             VLOG|UcmTop.v\
                             MOD|CW123456_EX_1_0

#Include the file to set up RapidMake Search Paths for this module.
include $($(RMK_MOD_NAME)_RMK_DIR)/rmk/ default.rsp

###Boilerplate - DO NOT MODIFY
$(RMK_MOD_NAME)_RMK_VERSION := 1.00
include $(RMK_PARSER_FILE
```

FIG. 10

UcmTop.rmk FILE

```
#Name of this module.
RMK_MOD_NAME := UCMTB

#Do not include path information here.  This should correspond to a
#RMK_MOD_NAME in another .rmk file.
$(RMK_MOD_NAME)_SUB_MODS := UCMTOP

#The path from the CustomerTb.rmk to the testbench files must be
#included.
$(RMK_MOD_NAME)_RTL_FILES := VLOG|testbench/ClockGen.v \
                             VLOG|testbench/InputBFM.v \
                             VLOG|testbench/OutputBFM.v \
                             VLOG|testbench/UcmTb.v \
                             YLIB|${LSI_RW}/lib3p/verilog/udps
```
50 (arrow pointing to VLOG lines)

```
#Include file to set up RapidMake Search Paths for this module.
#No .rsp file is included because the paths are listed in the
# $(RMK_MOD_NAME)_RTL _FILES variable.

###Boilerplate - DO NOT MODIFY.
$(RMK_MOD_NAME)_RMK_VERSION := 1.00
include $(RMK_PARSER_FILE)
```

FIG. 11
TESTBENCH .rmk FILE
(UcmTb.rmk)

```
#Common Configuration Options
#Define where to find the file containing common configuration options
#and functions.
RMK_CONFIG_FILE = ${LSI_RI}/rmk/RapidMake.config

#Include common configuration options.  This include causes the
#RapidMake.rmkindex file to be generated because the RapidMake.config
#file includes the RapidMake.functions file.
include $(RMK_CONFIG_FILE)

#Override RapidMake.config variables if the user wants to use a
#different revision of the encrypted RTL
RMK_SIM_TOOL         := vcs
RMK_SIM_TOOL_VERSION := 6.2

#Define and include top-level module.
RMK_TOP_MOD := UCMTB
ifdef RMKINDEX_INCLUDED
    include $(call get_rmk_files, $(RMK_TOP_MOD))
endif hdl_sim_compile:
        ${MAKE}  -f $(RMK_SIM_RAPIDMAKE_FILE) compile \
            'FILES = $(call get_files_typed_recursive, \
                $(RMK_TOP_MOD), RTL,)'
```

FIG. 12
TOP-LEVEL MAKEFILE

```
CW123456_EX_1_0_RMK_DIR  := $(LSI_RRCW)/cw123456_ex_1_0/prod
CW123456_EX_1_0_RMK_FILE := $(CW123456_1_0_RMK_DIR)/cw123456_ex_1_0.rmk UCMTOP_RMK_DIR  := $(LSI_RI)/rmk
UCMTOP_RMK_FILE := $(UCMTOP_RMK_DIR)/UcmTop.rmk UCMTB_RMK_DIR  := $(LSI_RI)/sim/sve
UCMTB_RMK_FILE := $(UCMTB_RMK_DIR)/UcmTb.rmk
```

FIG. 13

RapidMake.rmkindex file

```
FILES = \
   VLOG|$(LSI_RI)/rtl/UcmBlock.v \
   VLOG|$(LSI_RI)/rtl/UcmTop.v \
   VLOG|$(LSI_RRCW)/cw123456_ex_1_0/prod/sim/rtlprot/vcs/6.2 \
         cw123456_ex_1_0.vp \
   VLOG|$(LSI_RI)/sim/sve/testbench/ClockGen.v \
   VLOG|$(LSI_RI)/sim/sve/testbench/InputBFM.v \
   VLOG|$(LSI_RI)/sim(sve/testbench/OutputBFM.v \      — 54
   VLOG|$(LSI_RI)/sim/sve/testbench/UcmTb.v \ ←
   YLIB|$(LSI_RW)/lib3p/verilog/udps
```

FIG. 14

OUTPUT LIST OF FILES

PROCESS AND APPARATUS FOR ABSTRACTING IC DESIGN FILES

CROSS-REFERENCE TO RELATED APPLICATION

The present application is based on and claims the benefit of U.S. Provisional Patent Application No. 60/489,339 filed Jul. 22, 2003 for "Automated Method of Abstracting Design Files", and U.S. Provisional Patent Application No. 60/502,592 filed Sep. 12, 2003 for "RapidMake Tool Reference", both by Robert Broberg III, John C. Reddersen and Judy M. Gehman, the contents of both of which are hereby incorporated by reference in their entirety.

FIELD OF THE INVENTION

This invention relates to integrated circuit (IC) design, and particularly to a process and apparatus for movement of IC design files between environments.

BACKGROUND OF THE INVENTION

Application specific integrated circuits (ASICs) are used in a wide range of electronic devices. ASICs incorporate designs specifically matched to the electronic device, often reflecting circuit designs of the device manufacturer. In such cases, the ASIC is designed by an IC designer or user employed by or associated with the device manufacturer. Ordinarily, the device manufacturer does not have the capability of actually manufacturing the ASIC, so it is common for such device manufacturers to select an IC foundry to perform actual manufacture of the ASIC. In the design process, the designer uses tools supplied by the IC manufacturer so that the resulting chip will be compatible to the IC manufacturer's fabrication requirements.

LSI Logic Corporation of Milpitas, Calif., supplies tools and a design methodology based on RapidChip® platform ASICs. The RapidChip platforms are chips containing all silicon-based layers of an IC, but without metal interconnection layers. The silicon layers are configured into gates that can be configured into cells using LSI Logic Corporation's CoreWare® logic and design concepts. The chip designer designs the additional metal layers for the base platform to thereby configure the chip into a custom ASIC employing the customer's intellectual property. More particularly, the chip designer might use LSI Logic Corporation's RapidWorx® design system with included FlexStream® processes to design and test an ASIC based on the RapidChip platform configured to the customer's custom application. The RapidChip platform permits the development of complex, high-density ASICs in minimal time with significantly reduced design and manufacturing risks and costs.

During the design process, it is common to define the ASIC in a hardware description language (HDL) such as Verilog, representing the circuit in text, rather than graphically. The HDL description defines the functions performed by the cells and the relationship to input and output pins (targets) of the cells. The HDL description of an integrated circuit can be written at an intermediate level known as a register transfer language (RTL). The RTL description is transportable to other environments through the use of tools. For example, a logic synthesis tool can convert a RTL description of an integrated circuit into a gate-level netlist for a given technology library. The netlist can then be applied to a simulator, such as a Synopsys VCS simulator, for test purposes.

Integrated circuits are often described in multiple files. Some files may define circuit portions configured to an IC manufacturer's standard logic circuits, and other files may define portions configured to the user's intellectual property. A problem arises, however, when applying a multi-file circuit description to another environment.

A list file is a directory that identifies RTL files and their paths. For example, a call to a Synopsys VCS simulator might list RTL files and their full paths as:

```
vcs\
    <various options>\
    /full/path/to/file1.v\
    /full/path/to/file2.v\
    ...
    /full/path/to/filen.v
``` where <various options> identifies VCS simulator options. The code might be simplified using a list file that identifies, as a design list, the paths to the files:

```
vcs\
    <various options>\
    -f design.1st
``` where design.1st identifies the files and their respective paths:

```
/full/path/to/file1.v
/full/path/to/file2.v
...
/full/path/to/filen.v
```

A problem arises that the file paths may change when files are moved in the directory structure. Typically, the list file is created containing hard-coded paths or relative path types to locate objects. The list file correlates paths in the receiving environment to paths in the sending environment. However, the list file must be updated upon movement of the design file to a different environment. As an alternative to updating, the list file may contain references to multiple links that correlate a current location to locations in each of a plurality of environments. However, both of these solutions are time consuming, and adversely affects the time required for the design phase.

The present invention is directed to an automated technique to manage IC design file paths as the design files are applied to different environments.

SUMMARY OF THE INVENTION

In one embodiment of the invention, file paths are abstracted for a plurality of design files, herein described as RTL files. Description files are generated defining at least a portion of an integrated circuit, and define a hierarchy of the HDL files. The description files are parsed to identify file paths to each of the plurality of HDL files. In some embodiments, a directory tree contains the names of the HDL files, and the directory tree is parsed to identify the file paths. An index is generated correlating each description file and its respective file path.

Each design path in the index is defined in an environment of the description files. In use, file paths in the environment of an application are identified, and the index is applied to the file paths to define full file paths for each design file through the original environment and that of the application. The design files are then applied to the application using the full file paths.

In other embodiments, the process is carried out in a processor or computer under control of a computer readable program having code that causes the computer to carry out the steps of the process.

BRIEF DESCRIPTION OF THE DRAWINGS

FIGS. 3-7 are illustrations useful in explaining certain features of the invention.

FIGS. 8-14 are code listings of an example of the invention useful in explaining operation of the invention.

DETAILED DESCRIPTION OF THE PREFERRED EMBODIMENTS

Figure 1:
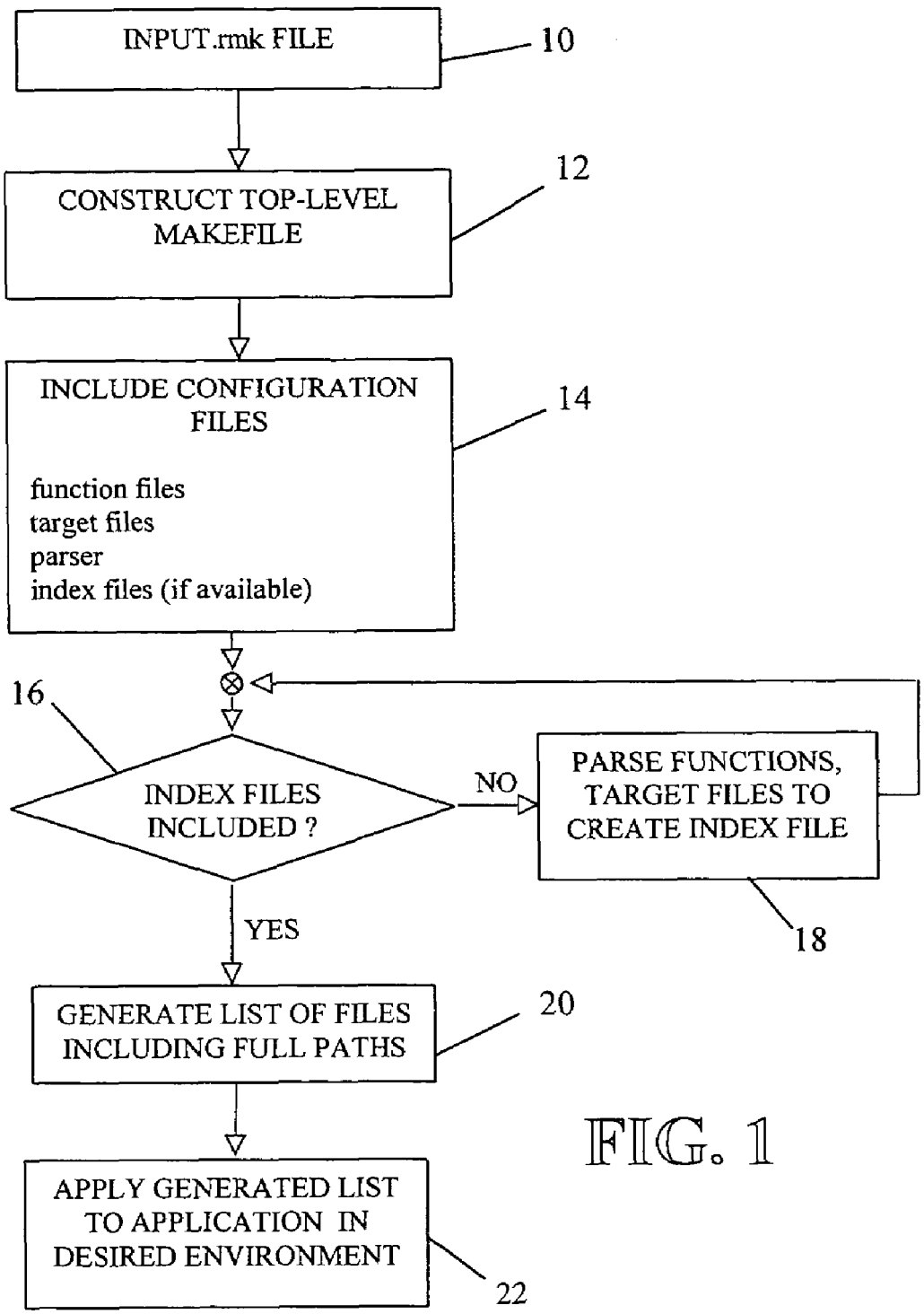
FIG. 1 is a flowchart of a process of abstracting IC design files in accordance with the presently preferred embodiment of the present invention.

The presently preferred embodiment of the present invention is directed to the methodology of the RapidChip platform ASIC and is a tool that permits chip design files, such as RTL descriptions, having file paths in one environment (system), to be applied to another environment (system), such as a simulator, and to manage the design files for location changes. In preferred embodiments, the tool, sometimes herein called a RapidMake tool, is written in Perl, such as Perl 5.6, and makes use of GNU Make software, such as GNU Make 3.80, which is a tool that uses defined rules to execute commands. GNU Make is used in the generation of executables and other non-source files of a program from the program's source files. GNU Make obtains knowledge of how to execute commands from a makefile program that lists the commands and the rules for executing the commands.

The tool according to the present invention dynamically generates lists of the source and library files required for each shell that other tools will manipulate. With the present invention, the designer can use higher level makefiles that are provided or create makefiles to manipulate the design files for each shell. As a result, hard-coded and relative paths in shell script usage are eliminated.

As used herein, a "shell" comprises information describing an aspect of a design. For example, an RTL shell defines files for a complete HDL description of a design; a doc shell defines the documentation for a design. A "makefile" is a file that provides commands and the rules for executing commands to the GNU Make tool.

While the invention will be described in the environment of designing and testing ASIC designs developed using a Rapid-Chip platform and CoreWare logic blocks, the invention is applicable to design and testing of ASICs developed by other techniques.

The makefile used in the present invention parses the RapidMake description file (.rmk) of each RapidSlice module, CoreWare module and User Core Module (UCM). The makefile creates a list of file names with their complete directory paths. This list is used to provide the shell files to other tools such as simulators, compilers, etc.

Each CoreWare module has one or more description files, sometimes herein called ".rmk files". A top-level .rmk file defines the files for each shell of the block, and its location defines the base directory for the block deliverables. Lower-level .rmk files may also be included. The description files (.rmk files) provide a hierarchical list of the source or design files in RTL. The designer builds a .rmk file for the User Core Module (UCM) which will reference the .rmk files for each of the blocks in the CoreWare module in the design and the blocks in the UCM. The designer does not need to modify the CoreWare .rmk file and therefore does not need to know the directory structure of the CoreWare component.

File Definition

Four types of files are employed in the present invention: User Generated Files, RapidMake Generated Files, Rapid-Make Tool Files and RapidMake Application Files.

1. User Generated Files

User Generated Files are the inputs to the tool created by the designer, and include RapidMake.config, <design>.rmk file, RapidMake.overrides, RapidMake Search Path (RSP) file and a top-level makefile.

A. RapidMake.config

The RapidMake.config file defines top-level variables and search paths for the block. All these variables can be overridden by the top-level makefile. Table 1 describes the definitions of these top-level variables.

TABLE 1

RapidMake.config Variables

| Variable | Description |
|---|---|
| RMK_BASEFUNCTIONS_FILE | Location of the RapidMake.functions file |
| RMK_HOME_DIR | Location of the RapidMake library files |
| RMK_INDEX_FILE | Location of the index file to .rmk files |
| RMK_INDEX_OVERRIDES_FILE | Location of the file containing user overrides |
| RMK_INDEX_SEARCH_DIRS | List of directories recursively searched for *.rmk files when creating $(RMK_INDEX_FILE) |
| RMK_PARSER_FILE | Identifies to a makefile used to generate a list of all hierarchical submodules |
| RMK_RAPIDMAKE_SEARCH_DIRS | List of directories to search for RapidMake files |
| RMK_SLICE_DIR | Location of the slice used for the design for instance creation |
| RMK_TARGETS_FILE | Location of the makefile containing the base RapidMake targets |

The RapidMake.config file may also include optional variables identified in Table 2. These variables may be used by the .rmk file. If they are not set in the RapidMake.config file, they may be needed in the top-level makefile.

TABLE 2

| Optional RapidMake.config Variables | |
|---|---|
| Variable | Description |
| LSI_TECHNOLOGY | Identifies the technology. For example valid LSI_TECHNOLOGYs are: G12P, G12R, G12D, GFLXP, GFLXR |
| RMK_DEBUG | Causes tool to print many debug messages |
| RMK_MODE | The mode that this makefile is setup to run. Valid RMK MODEs are: DOCS: All Rapid docs ASIC_DOCS: All ASIC docs SIM: Files for simulations SIM_FUNC: Files only for functional simulations SIM_GATE: Files only for gate-level simulations SYN: Files for Synthesis |

Common shell utilities that may be used by all makefiles are also defined in the RapidMake.config file. Table 3 identifies these files.

TABLE 3

| Common Shell Utility Variables | |
|---|---|
| Variable | Value |
| CP | cp |
| MAKE | make --no-print-directory -r -R |
| RM | rm -f |

The RapidMake.config file may also include optional application tools, in the form RMK_<OPERATION>_LANGUAGE, RMK_<OPERATION>_TOOL, RMK_<OPERATION>_TOOL_VERSION and RMK_<OPERATION>_RAPIDMAKE_FILE. These variables can be overridden in the top-level makefile.

TABLE 4

| RapidMake.config Optional Application Variables | |
|---|---|
| Variable | Description |
| RMK_SIM_LANGUAGE | Language used for simulation. Example: verilog |
| RMK_SIM_TOOL | Tool used for simulation Example: modelsim |
| RMK_SIM_TOOL_VERSION | Tool version used for simulation Example: 5.7 |
| RMK_SIM_RAPIDMAKE_FILE | Location of the makefile used to compile the simulation model |

B. <design>.rmk File

The <design>.rmk file defines the files for each shell for a block or subsystem. There is one .rmk file for each CoreWare module and for the UCM module at the top level. There may be other .rmk files lower in the hierarchy of the design. The <design>.rmk file uses the .rmk suffix. Table 5 sets forth the general variables of the .rmk file. The RMK_MOD_NAME and $(RMK_MOD_NAME)_RMK_VERSION variables identify the module and the version of the tool used to develop the .rmk file. For example:

```
RMK_MOD_NAME := CW123456_IDSTRING_1_0
$(RMK_MOD_NAME)_RMK_VERSION := 1.00
```

The other variables of Table 5 are optional. If more than one .rmk file is found that defines the same module name, the tool according to the present invention will use the first .rmk file it finds. The user may override a selected .rmk file, such as if more than one .rmk file contains the same module name.

TABLE 5

| <design>.rmk General Variables | |
|---|---|
| Variable | Description |
| RMK_MOD_NAME | Name of this module |
| $(RMK_MOD_NAME)_INFO_TXT | Text string to describe information about this module that can be obtained with a query. |
| $(RMK_MOD_NAME)_RMK_VERSION | Identifies the version of the tool used for this .rmk file development |
| $(RMK_MOD_NAME)_SUB_MODS | List of submodules used by this module |

Table 6 identifies the shell specific .rmk file variables used to define the files relating to each shell.

TABLE 6

| <design>.rmk Shell Specific Variables | |
|---|---|
| Variable | Description |
| $(RMK_MOD_NAME)_DOCS_FILES | List of all documents for this module. Valid TYPEs include: APPNOTE: application notes DATASHEET: data sheets ERRATA: Errata notes INFO: RELEASENOTE: release notes TECHMAN. technical manuals USERGUIDE: user guides |
| $(RMK_MOD_NAME)_LAY_FILES | List of layout files used in this module. Valid TYPEs include: DEF: .def files |
| $(RMK_MOD_NAME)_RTL_FILES | List of .rtl files used in this module. Valid TYPEs include: VLOG: verilog files without +protect/endprotect pairs needing to be added VLOGP: verilog files with +protect/ endprotect pairs to be added, but leave the module and I/O declarations open VLOGFP: verilog files with +protect/endprotect pairs to be added around entire module VLIB: files to prefix with -v |

TABLE 6-continued

<design>.rmk Shell Specific Variables

| Variable | Description |
|---|---|
| | VLIBP: files to prefix with −v, and add +protect/ endprotect pairs similar to VLOGP |
| | VLIBFP: files to prefix with −v and add +protect /endprotect pairs similar to VLOGFP |
| | YLIB: files to prefix with −y |
| $(RMK_MOD_NAME)_ RWI_FILES | List of RapidWorx input files used in this module. Valid TYPEs include: MEM: input for GenMem CLK: input for GenClk IO: input for GenIO |
| $(RMK_MOD_NAME)_ RWO_FILES | List of RapidWorx output files used in this module. Valid TYPEs include: TBD |
| $(RMK_MOD_NAME)_ SW_FILES | List of software/firmware files used in this module. Valid TYPEs include: TBD |
| $(RMK_MOD_NAME)_ TST_FILES | List of test files used in this module. Valid TYPEs include: TBD |
| $(RMK_MOD_NAME)_ RTLAN_FILES | List of all .lef files for this module. Valid TYPEs include: LEF: .lef files SYNLIB: .synlib files SDC: .sdc files |

A UNIX example of the usage of this variable is:

```
$(RMK_MOD_NAME)_<SHELL>_FILES := \
    TYPE1|file1.ext1 MOD|MODNAME \
    TYPE2|file2.ext2 files3.ext
```

Lists of files are assigned to these variables. The lists can be parsed using a TYPE indicator, such as the "TYPE|file.ext" syntax described. This indicator is used to sort the shell files into subcategories. If a TYPE is not specified with a file (the filex3.ext above), that file will be extracted when UNTYPED is specified or if no TYPE is specified as described below.

If no TYPE is specified for extraction, all files regardless of TYPE will be extracted. Consider:

```
$(RMK_MOD_NAME)_DOC_FILES := APPNOTE|appnote1.fm \
    TECHMAN|techman1.fm \
    USERGUIDE|userguide1.fm \
    doc1.fm
```

If the type APPNOTE is specified, appnote1.fm will be extracted. If no type is specified, appnote1.fm, techman1.fm, userguide1.fm, and doc1.fm will be extracted.

If a file is listed twice with different types assigned and if no TYPE is specified for extraction, the file will be listed twice. If there is a duplication of information, the unique function described below can be used to remove the duplicate information. The TYPE values can be expanded without modification to the RapidMake source code.

The RapidMake.config optional variables described in Table 4 are used in .rmk files to allow multiple versions of a file to be supported without requiring a change in the .rmk file. This allows the user to select a version of the file to use in the RapidMake.config or the top-level makefile. For example, if an encrypted RTL file is provided for several simulators, it can have the following .rmk file entry.

```
$(RMK_MOD_NAME)_RTL_FILES := \
    VLOG|$(RMK_SIM_LANGUAGE)/$(RMK_SIM_TOOL)\
    $(RMK_SIM_TOOL_VERSION)/file.vp
```

In this example the RapidMake.config file might specify use of ModelSim version 5.7, but the top-level makefile might specify VCS version 7.0 without modifying the .rmk file.

The list of files for the $(RMK_MOD_NAME)_ <SHELL>_FILES can also use a MOD indicator in the syntax "MOD|MODNAME". As explained below, this optional indicator allows submodule files to be placed in the list of files being specified. This allows the user more control over the hierarchical build order of the list of files.

A variable RMK_MODE can be passed to the RapidMake tool from the RapidMake.config file or top-level makefile to further define the files that make up a shell. Sometimes different files are required depending on the application targeted for the files. For example a different set of RTL files might be required for RTL simulations versus synthesis such as swapping out simulation and memory models. An example of using the RMK_MODE in a .rmk file is as follows.

```
ifeq ($(RMK_MODE),SIM_FUNC)
    $(RMK_MOD_NAME)_RTL_FILES := \
        $(DIR_ARM926EJS)/ARM926EJS.v
endif
ifeq ($(RMK_MODE), SIM_GATE)
    ifeq ($(LSI_TECHNOLOGY),G12R))
        $(RMK_MOD_NAME)_RTL_FILES := \
            $(LSI_RRCW)/cw001107_1_0/prod/gate/verilog \
            cw001107_1_0_all.v
    endif
    ifeq ($(LSI TECHNOLOGY),GFLXR)
        $(RMK_MOD_NAME)_RTL_FILES := \
            $(LSI_RRCW)/cw001120_1_0/prod/gate/verilog \
            cw001120_1_0_all.v
    endif
endif
ifeq ($(RMK_MODE),SYN)
    ifeq ($(LSI_TECHNOLOGY,GI2R))
        $(RMK_MOD_NAME)_RTL_FILES := \
            $(LSI_RRCW) /cw00110V_1_0/prod/gate/verilog \
            cw001107_1_0_all.v
    endif
    ifeq ($(LSI TECHNOLOGY),GFLXR)
        $(RMK_MOD_NAME)_RTL_FILES := \
            $(LSI_RRCW)/cw001120_1_0/prod/gate/verilog \
            cw001120_1_0_all.v
    endif
endif
```

The above example sets up different verilog files based on RMK_MODE of simulation versus synthesis. The simulation is broken down further to distinguish between design simulation modules (DSM) for functional simulations and gate-level files for gate-level simulations. The variable LSI_TECHNOLOGY is also setup in the RapidMake.config file and can be overridden in the top-level makefile. The $(DIR_ARM926EJS) variable is a design simulation model variable that is setup before using the .rmk file to extract RTL files for functional simulations.

The RMK_MODE values can be expanded without modification to the RapidMake source code, but the values are standardized for the CoreWare blocks so they will all work together. The value effects the .rmk file and the naming of the application makefile. Valid RMK_MODE values are shown in Table 2.

The .rmk file can contain include statements. One include statement is:

include $(RMK_PARSER_FILE)

This file is used to parse the .rmk files, and allows a different parsing file to be used if necessary in special cases.

Another include statement sets up RapidMake Search Paths for the module. An example is:

include $($(RMK_MOD_NAME)_RMK_DIR)/rmk/default.rsp

The include statements are more fully explained below.

C. RapidMake.overrides

The RapidMake.overrides file allows the user to override the .rmkindex file. Table 7 describes the variable definitions. The rmkindex file is created by the tool when the tool is invoked. An informational note may be generated by the RapidMake tool when a module has been overridden by the overrides file.

TABLE 7

RapidMake.overrides Variables

| Variable | Description |
| --- | --- |
| $(RMK_MOD_NAME)_RMK_DIR | Directory path from the root to the .rmk file location |
| $(RMK_MOD_NAME)_RMK_FILE | Location and name of .rmk file in the form of $($(RMK_MOD_NAME)_RMK_DIR)/ $(RMK_MOD_NAME)_RMK_FILE |

D. RapidMake Search Path File

The RapidMake Search Path (RSP) file sets up the default search paths for the design. This file uses a .rsp file extension. The search paths define the order that the tool will search to find files. This allows multiple versions of a file to exist and allows the user to control which is found first. Table 8 shows the variables used for the .rsp file and Table 9 shows the variables used for each shell. These variables are of the form $(RMK_MOD_NAME)_<SHELL>_RSP.

TABLE 8

.rsp file variables

| Variable | Description |
| --- | --- |
| BASE_RSP_DIR | Defines the starting location for all paths |
| $(RMK_MOD_NAME)_RSP | Base RapidMake Search Path (RSP) (searched after shell specific path) |

TABLE 9

Shell related .rsp file variables

| Variable | Description |
| --- | --- |
| $(RMK_MOD_NAME)_DOCS_RSP | Doc shell RapidMake Search Path |
| $(RMK_MOD_NAME)_RTL_RSP | RTL shell RapidMake Search Path |
| $(RMK_MOD_NAME)_RTLAN_RSP | RTL Analysis shell RapidMake Search Path |
| $(RMK_MOD_NAME)_SIM_RSP | Simulation shell RapidMake Search Path |
| $(RMK_MOD_NAME)_STA_RSP | Static Timing Analysis shell RapidMake Search Path |
| $(RMK_MOD_NAME)_SW_RSP | Software/Firmware shell RapidMake Search Path |
| $(RMK_MOD_NAME)_SYN_RSP | Synthesis shell RapidMake Search Path |
| $(RMK_MOD_NAME)_TST_RSP | Test shell RapidMake Search Path |

The search is performed looking at the shell-related paths first, then the paths specified by the $(RMK_MOD_NAME)_RSP variable, and then the paths specified by the BASE_RSP_DIR variable. The .rsp file is not required, but when used it is included by the .rmk file. If a .rsp file is not included by the .rmk file, the tool will search the directory containing the .rmk file and any direct subdirectories that have been specified with the file name in the $(RMK_MOD_NAME)_<SHELL>_FILES variable.

E. Top-level Makefile

A top-level makefile operates the tool according to the invention to generate a list of shell files. The top-level makefile includes the RapidMake.config file to setup the environment, specify the top module, and setup other variables outlined in Table 10. The makefile is also used to override variables set in the RapidMake.config file, which is possible if the variables are set after the RapidMake.config file is included into the top-level makefile.

TABLE 10

Top-Level Makefile Variables

| Variable | Description |
| --- | --- |
| RMK_CONFIG_FILE | Define the location of the RapidMake.config file |
| RMK_TOP_MOD | Specify the top module name of the design. This is set to a valid RMK_MOD_NAME in a .rmk file |

2. Rapidmake Generated Files

The RapidMake tool according to the present invention generates the RapidMake.rmkindex file which lists the directory path and file name of each .rmk file found in the specified search path. The search path is defined in the RapidMake.config file using the RMK_INDEX_SEARCH_DIRS variable. The directory path and file name values can be overridden by the user by duplicating the variable names with new values in the RapidMake.overrides file. The RapidMake.rmkindex file has the same variable formats as the RapidMake.overrides files shown in Table 7.

3. Rapidmake Tool Files

Some functions and make targets are established by the RapidWorx tool in the RapidMake.functions file (RMK_BASEFUNCTIONS_FILE—Table 1) and RapidMake.target files (RMK_TARGET_FILE—Table 1). A Rapid- Make.parser file (RMK_PARSER_FILE—Table 1) is used to parse through the .rmk files. Tables 11, 12, 13, 14, 15, and 16 identify the functions available in the RapidMake.functions file. The general functions available in RapidMake.functions are set forth in Table 11, the functions for handling TYPEs available in RapidMake.functions are set forth in Table 12, the functions for handling modules available in RapidMake.functions are set forth in Table 13, the functions for handling .rmk files available in RapidMake.functions are set forth in Table 14, the functions for handling files available in RapidMake.functions are set forth in Table 15, and the functions for RSP handling available in RapidMake.functions are set forth in Table 16. These functions can be called by a higher level makefile to manipulate shell information.

TABLE 11

General Functions available in RapidMake.functions

| Name | Usage/Arguments | | Description |
|---|---|---|---|
| to_upper | Usage: | $(call to_upper, ARG1) | Converts all characters to UPPERCASE |
| | ARG1: | List of items | |
| to_lower | Usage: | $(call to_lower, ARG1) | Converts all characters to lowercase |
| | ARG1: | List of items | |
| unique | Usage: | $(call unique, ARG1) | Removes all duplicate entries keeping the leftmost one |
| | ARG1: | List of items | |
| print_vars | Usage: | $(call print_vars, ARG1) | Expands a list of makefile variables to a list of: "echo VARIABLE = $(VARIABLE)" |
| | ARG1: | List of makefile variables | |
| collapse_vars | Usage: | $(call collapse_vars, ARG1, ARG2) | Replaces expanded VARIABLE with "$(VARIABLE)" |
| | ARG1: | List of VARS to collapse (if blank, simply return ARG2) | |
| | ARG2: | List of items | |
| rmk_error | Usage: | $(call rmk_error, ARG1, ARG2) | Generates a standard error message. If the variable RMK_ERROR_LEVEL equals stop, the make will stop when rmk_error is executed |
| | ARG1: | Description of where the error occurred | |
| | ARG2: | Description of the error | |

TABLE 12

Functions For Handling TYPEs Available in RapidMake.functions

| Name | Usage/Arguments | | Description |
|---|---|---|---|
| fix_untyped | Usage: | $(call fix_untyped, items ARG1) | Adds UNTYPED| to all shorthand untyped |
| | ARG1: | List of items | |
| is_type | Usage: | $(call is_type, ARG1, ARG2) | Returns TRUE if item is of one of the specified types |
| | ARG1: | List of types | |
| | ARG2: | Item | |
| get_type | Usage: | $(call get_type, ARG1) | Returns a sorted and unique list of the types of all list items. Shorthand untyped items return the value UNTYPED |
| | ARG1: | List of items | |

TABLE 12-continued

Functions For Handling TYPEs Available in RapidMake.functions

| Name | Usage/Arguments | | Description |
|---|---|---|---|
| set_type | Usage: | $(call set_type, ARG1, ARG2) | Adds the specified type to all list items |
| | ARG1: | Type to set (if blank return ARG2) | |
| | ARG2: | List of items | |
| change_type | Usage: | $(call change_type, ARG1, ARG2, ARG3) | Change all old typed items to new type |
| | ARG1: | List of old types (if blank, return ARC 3) | |
| | ARG2: | New type (if blank, return ARG3) | |
| | ARG3: | List of items | |
| strip_type | Usage: | $(call strip_type, ARG1) | Removes type from all list items |
| | ARG1: | List of items | |
| filter_type | Usage: | $(call filter_type, ARG1, ARG2) | Filters the list of items down to those items of the specified type(s) |
| | ARG1: | List of types to keep (blank = ALL) | |
| | ARG2: | List of items | |
| filter_out_type | Usage: | $(call filter_out type, ARG1, ARG2) | Filters the list of items down to those items not of the specified type(s) |
| | ARG1: | List of types to remove (blank = NONE) | |
| | ARG2: | List of items | |
| run_type_callback | Usage: | $(call_run_type_callback, ARG1, ARG2) | Runs each list item's associated type callback (ARG1_<TYPE>) function, if it exists, replacing the item with the result of the callback function, otherwise just returns the list item |
| | ARG1: | Callback function prefix (if blank, return ARG2) | |
| | ARG2: | List of items | |

TABLE 13

Functions for handling modules available in RapidMake.functions

| Name | Usage/Argument | | Description |
|---|---|---|---|
| strip_mods | Usage: | $(call strip_mods, ARG1) | Removes all modules from a list of items |
| | ARG1: | List of items | |
| get_sub_mods | Usage: | $(call get_sub_mods, ARG1) | Returns all direct sub-modules of RMK_MOD_NAME |
| | ARG1: | RMK_MOD_NAME | |
| get_sub_mods_recursive | Usage: | $(call get_sub_mods_recursive, ARG1) | Returns all recursive modules of RMK_MOD_NAME |
| | ARG1: | RMK_MOD_NAME | |
| print_hierarchy | Usage: | $(call print_hierarchy, ARG1) | Prints the hierarchy starting at RMK_MOD_NAME |
| | ARG1: | RMK_MOD_NAME | |

TABLE 14

Functions for handling .rmk files available in RapidMake.functions

| Name | Usage/Arguments | | Description |
|---|---|---|---|
| get_rmk_files | Usage: | $(call get_rmk_files, ARG1) | Expands list of modules to list of .rmk files defining the modules |
| | ARG1: | List of modules | |
| get_rmk_dirs | Usage: | $(call get_rmk_dirs, ARG1) | Expands list of modules to list of directories containing the .rmk files defining the modules |
| | ARG1: | List of modules | |

TABLE 15

Functions for handling files available in RapidMake.functions

| Name | Usage/Arguments | | Description |
|---|---|---|---|
| find_files | Usage: | $(call find_files, ARG1, ARG2) | Finds first file matching filename, or first list of files matching pattern in a list of directories |
| | ARG1: | Filename or pattern (e.g. *.v) | |
| | ARG2: | List of directories | |
| find_file | Usage: | $(call find_file, ARG1, ARG2) | Finds the first file matching filename or pattern in a list of directories |
| | ARG1: | Filename or pattern (e.g. *.v) | |
| | ARG2: | List of directories | |
| get_files_typed | Usage: | $(call get_files_typed, ARG1, ARG2, ARC3) | Returns the fully expanded pathnames to all files of the specified type(s) from the RMK_MOD_NAME_<SHELL>_FILES variable in the form of TYPE\|/path/to/file.ext |
| | ARG1: | RMK_MOD_NAME | |
| | ARG2: | SHELL | |
| | ARG3: | List of types to keep_or_blank means ALL types including untyped | |
| get_files_typed_recursive | Usage: | $(call get_files_typed recursive, ARG1, ARG2, ARG3, ARG4) | Returns the recursive fully expanded pathnames to all files of the specified type(s) from the RMK_MOD_NAME_<SHELL>_FILES variable in the form TYPE\|/path/to/file.ext |
| | ARG1: | RMK_MOD_NAME | |
| | ARG2: | SHELL | |
| | ARG3: | List of types to keep or blank means ALL types including untyped | |
| | ARG4: | List of modules traversed to get here | |
| get_files | Usage: | $(call get_files, ARG1, ARG2, ARG3, ARG4) | Returns the fully expanded pathnames to all files of the specified type(s) from the RMK_MOD_NAME_<SHELL>_FILES variable with types removed. |
| | ARG1: | RMK_MOD_NAME | |
| | ARG2: | SHELL | |
| | ARG3: | List of types to keep or blank means ALL types including untyped | |
| | ARG4: | Type callback prefix or if blank, don't run type callback | |
| get_files_recursive | Usage: | $(call get_files_recursive, ARG1, ARG2, ARG3, ARG4) | Returns the recursive fully expanded pathnames to all files of the specified type(s) from the RMK_MOD_NAME_<SHELL>_FILES variable with types removed |
| | ARG1: | RMK_MOD_NAME | |
| | ARG2: | SHELL | |
| | ARG3: | List of types to keep or blank means ALL types including untyped | |
| | ARG4: | Type callback prefix or if blank, don't run type callback | |

TABLE 16

Functions For RSP Handling Available in RapidMake.functions

| Name | Usage/Arguments | |
|---|---|---|
| rsp_expand | Usage: | $(call rsp_expand, ARG1, ARG2, ARG3, ARG4) |
| | ARG1: | RMK_MOD_NAME |
| | ARG2: | SHELL |
| | ARG3: | Additional error text for find_files |
| | ARG4: | Items to RSP expand |

An example of use of a get_files function (Table 15) from a makefile is:

$(call get_files, $(RMK_MOD_NAME), RTL, VLOG)

This command will gather all files using the TYPE of VLOG assigned to the $(RMK_MOD_NAME)_RTL_FILES variable.

The RapidMake.targets provides make targets that can be used by higher-level makefiles. These targets include:

make clean_rmkindex—which removes the RapidMake.rmkindex file.

make list_mods—which lists all available modules.

make print_hierarchy—which prints out the .rmk hierarchy starting at RMK_TOP_MOD.

make print_vars "VAR_LIST=RMK_MODE"—which prints all variables values in the variable "VAR_LIST" in the form: VAR=value.

make <VAR>_value—which, if <VAR> is a valid variable in the makefile, prints variable <VAR> in the form: VAR=VALUE.

make <MOD>_info—which, if <MOD> is a valid RMK_MOD_NAME, prints information on the module.

make <MOD>_hierarchy—which, if <MOD> is a valid RMK_MOD_NAME, prints out the .rmk hierarchy starting at <MOD>.

The RapidMake.parser file is included by the .rmk file, and is used to generate a hierarchical list of all submodules.

Checks may be built into the RapidMake tool files, for example to check to see if all the shell files exist that are listed in the .rmk files specified by the RapidMake.rmkindex file and issue a warning if a file does not exist.

4. Rapidmake Application Files

Makefiles are provided that use RapidMake to perform various tasks. These makefiles provide the RapidMake user with makefiles for common tasks and establish common makefile targets for each application. For example, simulation applications and their associated files include RapidMake.modelsim and RapidMake.vcs.

Construction and Operation

Having explained the various files and their functions and relationships, the construction and operation of the RapidMake tool according to the present invention may now be explained. Initially, the user creates a makefile that calls RapidMake functions and targets. Ordinarily, the creation of the makefile is performed by the user during the original design of the chip in the RapidChip environment. These functions and targets are used to build a list of files representing a shell. The list can then be applied to an application makefile to perform a task on the shell files, such as compiling all the RTL files for simulation.

Figure 2:
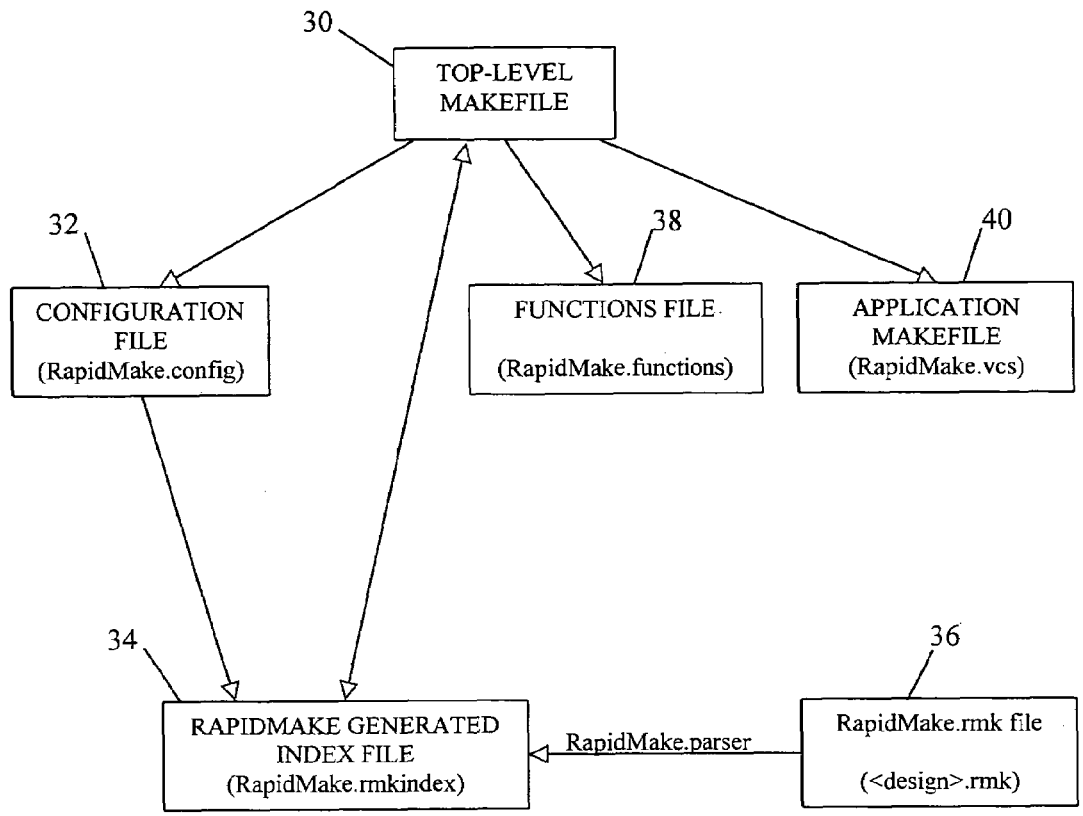
FIG. 2 illustrates the relationship of certain files during execution of the process shown in FIG. 1.

FIG. 1 is a flowchart of a process of building a list of files in accordance with an embodiment of the present invention. FIG. 2 illustrates relationships between the various files when performing the process of FIG. 1. In preferred embodiments, the process is carried out by a computer or processor operating under control of a computer readable program embodied in a computer readable medium, such as an optical or magnetic storage disk that is readable by a optical or magnetic disk drive coupled to the computer. The program includes computer readable program code that causes the computer to carry out the process.

The process of FIG. 1 constructs an .rmk file having a plurality of modules and submodules, each containing a name (RMK_MOD_NAME), the names of all direct submodules ($(RMK_MOD_NAME)_SUB_MODS) and the function or target files in the hardware description language, such as RTL: ($(RMK_MOD_NAME)_RTL_FILES). Typically the .rmk file is created by the designer or user when the ASIC design is created in the RapidChip environment.

A top-level module contains an .rmk file which identifies the module, all direct submodules and all function and target files used in the top module. For example, for a top-level module named TOP, having two submodules Blocks A and B and file "Top.v", the top level .rmk may be

```
RMK_MOD_NAME := TOP
$(RMK_MOD_NAME)_SUB_MODS := BLOCKA BLOCKB
$(RMK_MOD_NAME)_RTL_FILES := Top.v
```

Figure 3:
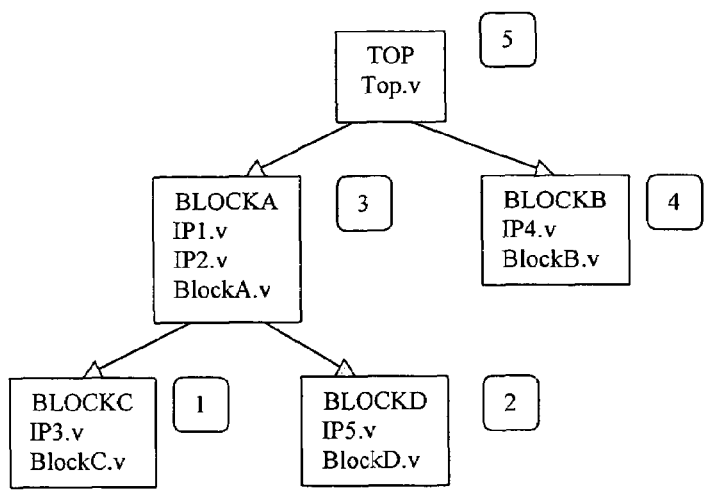

The .rmk file includes functions, such as RapidMake.function files, and targets, such as RapidMake.target files and/or user-defined target files. For example, FIG. 3 illustrates a submodule named Block A that contains files "IP1.v", "IP2v," and "BlockA.v". Blocks C and D are submodules to submodule Block A. Submodule BlockA is defined in the .rmk file as

```
In BlockA.rmk
RMK_MOD_NAME := BLOCKA
$(RMK_MOD_NAME)_SUB_MODS := BLOCKC BLOCKD
$(RMK_MOD_NAME)_RTL_FILES := IP1.v IP2.v BlockA.v
```

With reference to FIGS. 1 and 2, at step 10, the .rmk files are input representative of the portion of the integrated circuit being investigated. The portion is selected by the user and defines a search area. All .rmk files from the search area are input at step 10. At step 12, a makefile 30 is constructed, for example by a manual operation. At step 14, the Rapid Make.config files, described above in connection with Tables 1-4, are included in the makefile to set up the variables and search paths. Configuration files 32 thus includes the RapidMake.functions, RapidMake.targets, RapidMake.parser and (if not previously generated) the RapidMake.rmkindex files 34 which identify all modules and the paths to them. If at step 16 the RapidMake.rmkindex file 34 is not generated, the tool automatically generates it at step 18 using the RapidMake.parser file and the <design>.rmk files 36.

At step 18, the construction of the index file, Rapid Make.rmkindex, commences by parsing all .rmk files in the search area defined by the configuration files to identify paths to each .rmk file. More particularly, in the above example the .rmk file for the BlockA module identifies that BlockC and BlockD are subordinate to Block A. Consequently, the path information in the .rmk files may be expressed as a tree. Index 34 is completed by listing the .rmk files in the search area together with the respective paths to the top level of the system.

With the RapidMake.rmkindex file 34 completed at step 18, top-level makefile 30 can call any function file 38 (e.g., RapidMake.functions) using the get_files_recursive file causing the RapidMake tool to generate, at step 20, a list of files in the form <full_path>/file.ext, in the hierarchy defined by the .rmk files (i.e., the SUB_MODS and MOD| usage). The list of files is built using the functions from function file 38. Top-level makefile 30 can also call up other application makefiles 40, for other environments supported by the tool. Thus in one form of the invention, the list of files generated at step 20 is applied at step 22 to an application in a desired environment. For example, at step 22, the top level makefile 30 applies the list of files generated at step 20 to a RapidMake.vcs application file to perform a simulation of the design on a Synopsys VCS simulator.

When "MOD|MODNAME" syntax is not used in the $(RMK_MOD_NAME)_<SHELL>_FILES list variable in any of the .rmk files, the list of files built at step 20 in the order starting with the files of the lowest submodule found in the specified top module's first submodule and ending with the files listed in the top modules .rmk file. The submodules are listed in the $(RMK_MOD_NAME) SUB_MODS variable of the .rmk file and works through the list of modules in the $(RMK_MOD_NAME)_SUB_MODS variable in some order, such as from left to right. The lowest-level (e.g., leftmost) file is first in the list. This hierarchical build allows the user to control the order of the files in the output list by specifying the ordering in the $(RMK_MOD_NAME)_SUB_MODS variable. This default hierarchical build can be changed using the MOD|MODNAME in the $(RMK_MOD_NAME)_<SHELL>_FILES list variable in the .rmk file.

The following example uses .rmk file snippets to show the default build hierarchy for verilog RTL files. FIG. 3 is a graphical illustration of the process. In this case, the top module, RMK_MOD_NAME:=TOP, contains the names of submodules, $(RMK_MOD_NAME)_SUB_MODS:= BLOCKA BLOCKB, thus defining the path from the top level down.

```
In Top.rmk
RMK_MOD_NAME := TOP
$(RMK_MOD_NAME)_SUB_MODS := BLOCKA BLOCKB
$(RMK_MOD_NAME)_RTL_FILES := Top.v
In BlockA.rmk
RMK_MOD_NAME := BLOCKA
$(RMK_MOD_NAME)_SUB_MODS := BLOCKC BLOCKD
$(RMK_MOD_NAME)_RTL_FILES := IP1.v IP2.V BlockA.v
In BlockB.rmk
RMK_MOD_NAME := BLOCKB
$(RMK_MOD_NAME)_SUB_MODS :=
$(RMK_MOD_NAME)_RTL_FILES := IP4.v BlockB.v
In BlockC.rmk
RMK_MOD_NAME := BLOCKC
$(RMK_MOD_NAME)_SUB_MODS :=
$(RMK_MOD_NAME)_RTL_FILES := IP3.v BlockC.v
In BlockD.rmk
RMK_NAME := BLOCKD
$(RMK_NAME)_SUB_MODS :=
$(RMK_NAME)_RTL_FILES := IP5.V BlockD.v
```

A top-level makefile can be used to set the output of calling the get_files_recursive function to a variable called LIST_VAR. For this example LIST_VAR would have a file order of defining a directory for the datafile:

```
LIST_VAR =        <full_path>/IP3.v \
                  <full_path>/BlockC.v \
                  <full_path>/IP5.v \
                  <full_path>/BlockD.v \
                  <full_path>/IP1.v \
                  <full_path>/IP2.v \
                  <full_path>/BlockA.v \
                  <full_path>/IP4.v \
                  <full_path>/BlockB.v \
                  <full_path>/Top.v
```

Figure 4:
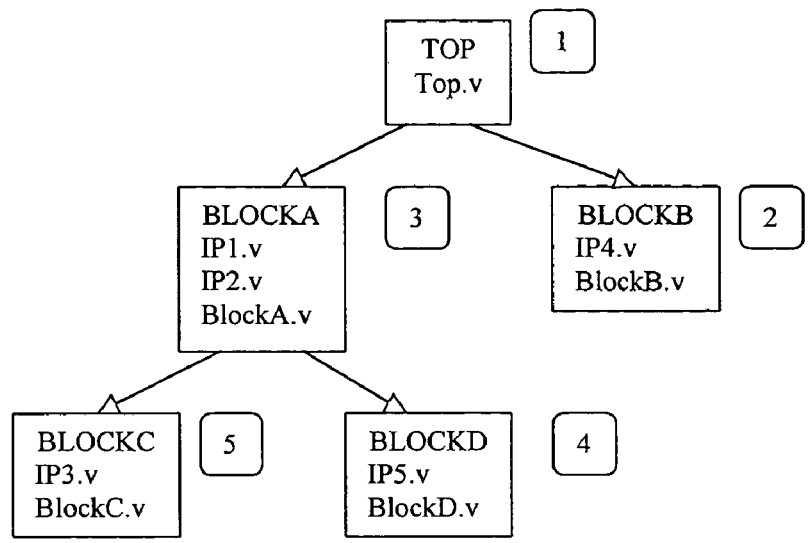

The default hierarchical build can be changed using MOD|MODNAME in the $(RMK_MOD_NAME)_<SHELL>_FILES list variable in any of the .rmk files. The following is an example of a hierarchical build with the effects of using MOD|MODNAME in the $(RMK_MOD_NAME)_<SHELL>_FILES list. The effects of this example are illustrated in FIG. 4.

```
In Top.rmk
RMK_MOD_NAME := TOP
$(RMK_MOD_NAME)_SUB_MODS := BLOCKA BLOCKB
$(RMK_MOD_NAME)_RTL_FILES := Top.v MOD|BLOCKB \
                             MOD|BLOCKA
In BlockA.rmk
RMK_MOD_NAME := BLOCKA
$(RMK_MOD_NAME)_SUB_MODS := BLOCKC BLOCKD
$(RMK_MOD_NAME)_RTL_FILES := IP1.v IP2.v BlockA.v \
                             MOD|BLOCKD MOD|BLOCKC
In BlockB.rmk
RMK_MOD_NAME := BLOCKS
$(RMK_MOD_NAME)_SUB_MODS :=
$(RMK_MOD_NAME)_RTL_FILES := IP4.v BlockB.v
```

-continued

```
In BlockC.rmk
RMK_MOD_NAME := BLOCKC
$(RMK_MOD_NAME )_SUB_MODS :=
$(RMK_MOD_NAME)_RTL_FILES := IP3.v BlockC.v
In BlockD.rmk
RMK MOD NAME := BLOCKD
$(RMK_MOD_NAME)_SUB_MODS :=
$(RMK_MOD_NAME)_RTL_FILES := IP5.V BlockD.v
```

A top-level makefile can be used to set the output of calling the get_files_recursive function to a variable called LIST_VAR. For this example LIST_VAR would have a directory file order of:

```
LIST_VAR =        <full_path>/Top.v \
                  <full_path>/IP4.v \
                  <full_path>/BlockB.v \
                  <full_path>/IP1.v \
                  <full_path>/IP2.v \
                  <full_path>/BlockA.v \
                  <full_path>/IP5.v \
                  <full_path>/BlockD.v \
                  <full_path>/IP3.v \
                  <full_path>/BlockC.v
```

There may be .rmk files found and listed in the RapidMake.rmkindex file that are not used during the build. This occurs if the .rmk files module name is not called by any other .rmk file found during the hierarchical build, or is not specified as the top module using the RMK_TOP_MOD variable (Table 10).

Debug information can be printed to standard output while using the top-level makefile by using the make '-d' option. For example:

make -d <target>

Debug can also be printed by setting the variable RMK_DEBUG in the RapidMake.config file or top-level makefile.

Output

The output of the RapidMake tool according to the present invention is a list of files and libraries that can be assigned to a variable in a makefile environment. This list can then be fed into simulators, synthesis tools and other scripts. To generate a list for RTL files for the example in FIG. 3 the following command would be used:

LIST VAR:=$(call get_files_recursive,TOP,RTL,,,)

where LIST_VAR is the output variable, get_files_recursive is a function defined in the RapidMake.functions file, and TOP is the top module name of the tree to traverse, RTL is the specified shell so that the $(RMK_MOD_NAME)_RTL_FILES variable is used. No TYPE is declared, so all files are gathered. No callback function is specified, so the files are not changed. The output variable list order will be:

```
LIST_VAR =        <full_path>/IP3.v \
                  <full_path>/BlockC.v \
                  <full_path>/IP5.v \
                  <full_path>/BlockD.v \
                  <full_path>/IP1.v \
                  <full_path>/IP2.v \
                  <full_path>/BlockA.v \
                  <full_path>/IP4.v \
                  <full_path>/BlockB.v \
                  <full_path>/Top.v
```

The example below demonstrates use of the callback function. The callback function allows the user to define a function associated with each TYPE. In this example the callback function is used to add '-v' in front of all VLIB type files and '-y' in front of all YLIB type files.

In TOP.rmk file:
$RMK_MOD_NAME=TOP
$(RMK_MOD_NAME)_RTL_FILES:=VLOG|file1.v
  VLIB|lib1.v  YLIB|dir1  VLOG|file2.v  VLIB|lib2.v
  YLIB|dir2

In makefile:
Setup functions of the form: name TYPE
compile_VLIB=-v $(1)
compile_YLIB=-y $(1)
$(call get_files_recursive,TOP,RTL,VLOG,) will return file1.v file2.v.
$(call get_files_recursive,TOP,RTL,VLIB,compile) will return -v lib1.v -v lib2.v.
$(call get_files_recursive,TOP,RTL,YLIB,compile) will return -y dir1 -y dir2.

Figure 5:
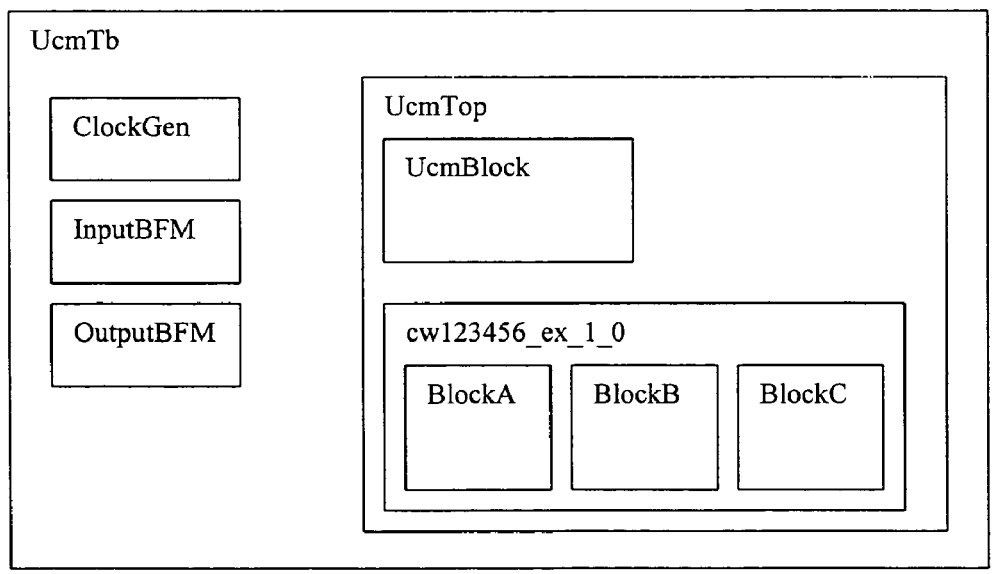

FIG. 5 illustrates a system useful in explaining use of the RapidMake tool according to the present invention to compile RTL for a Synopsys VCS simulator for a User Core Module (UCM) testbench for a RapidChip design. The system design is named UcmTop and contains a customer block named UcmBlock and a CoreWare block named cw123456_ex_1_0. The CoreWare block consists of sub-modules named BlockA, BlockB, and BlockC. The system design is delivered as a firm core with encrypted RTL. The testbench to test UcbTop is named UcmTb, and consists of a clock generator (ClockGen), input stimulus (InputBFM), and output checker (OutputBFM).

The variables of the RapidMake.config file are overridden by the top-level makefile to select encrypted RTL file (modelsim or vcs) to compile. The user files necessary for this conversion are RapidMake.config, RapidMake.overrides, cw123456_ex_1_0.rmk, UcmTop.rmk, UcmTb.rmk, default.rsp, and makefile. The RapidMake files necessary for this conversion are RapidMake.functions, RapidMake.parser, and RapidMake.targets. The application file is RapidMake.vcs.

Figure 7:
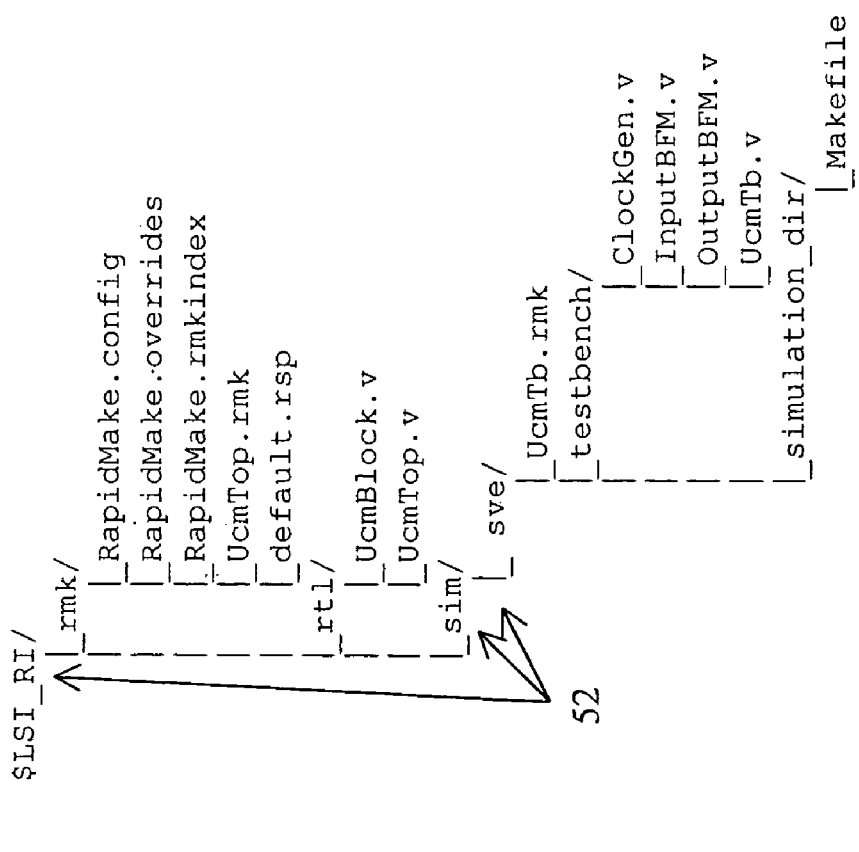

The directory structure of the index for the example of FIG. 5 is the hierarchical tree set forth in FIGS. 6 and 7.

The RapidMake.config file for this example is set forth in FIG. 8. For purposes of this example assume that standard RapidMake.overrides will be used. Therefore no variables are required to be set in the RapidMake.overrides file. The cw123456_ex_1_0.rmk file is set forth in FIG. 9, the UcmTop.rmk file is set forth in FIG. 10, the UcmTb.rmk file is set forth in FIG. 11, the top-level makefile is set forth in FIG. 12.

In FIG. 12, the makefile target calls the $(RMK_SIM_RAPIDMAKE_FILE) compile target to do the actual compile. In this example $(RMK_SIM_RAPIDMAKE_FILE) is the RapidMake.vcs file. FIG. 13 sets forth an example of the RapidMake.rmkindex file To compile the RTL files for a simulation, the make hdl_sim_compile command will cause the RapidMake.rmkindex file to be generated, and the list of variables output is generated in the order shown in FIG. 14. Thus, with the directory structure of FIGS. 6 and 7, the paths from the .rmk files to the application are achieved resulting in the paths shown in FIG. 14.

For example, consider the UcmTb testbench file shown in FIG. 5 applied to a Synopsys VCS simulator. As shown at 50 in FIG. 11, the .rmk file identifies the corresponding RTL files using the syntax
  $(RMK_MOD_NAME)_RTL_FILES:=       . . .
    VLOG|testbench/UcmTb.v \.

The complete path is constructed to the form <full_path>/file.ext by combining the location of the .rmk file ($LSI_RI/sim/sve), shown at 52 in FIG. 7, with the value (testbench/Ucm.Tb.v), shown at 50 in FIG. 11, resulting in the complete path 54 shown in FIG. 14. As a result, the RTL file is available to the environment of the simulator.

The present invention thus provides a methodology and toolset for automating the assembly of components, defined in a hardware description language, in tool and process flows. Each component's description file (.rmk file) provides details of the component's files and may refer to other components by symbolic names. The user needs only to understand the files for the components and symbolic names. The computer using the program tool according to the invention finds and uses sub-component files and scales without altering the format. All design files are resolved to absolute paths, thereby assuring that files are re-locatable in a receiving installation or environment.

Locations of shells are abstracted so that files for each shell may be processed based on various selections by the user. This allows the user to process shell TYPEs differently and select shells based on mode or usage. By separating the directory structure from tool flow, greater flexibility is permitted in organization of directory structures and removes the need for hard-coded and relative path definitions for components.

While the examples given describe use of a customer's logic as well as logic supplied by the IC manufacturer, the customer may establish the design to specify the customer's files using override functions. The use of the .rmk files to specify IC manufacturer files (e.g., CoreWare and Rapid Slice files) as well as customer-created files allows for the transportation of the entire design, or just a portion of it, without requiring the user/customer to understand which files belong to which shell tasks and without requiring the user/customer to understand the directory structure.

While the present invention has been described with the example of design files written in a hardware description language (i.e., RTL) description of an integrated circuit, the invention is applicable to any computer readable description of an object. For example, the design files may express a document written in Adobe Acrobat (.pdf) or other computer readable code, and the object may be any object whose design is tested or simulated by computer processes.

Although the present invention has been described with reference to preferred embodiments, workers skilled in the art will recognize that changes may be made in form and detail without departing from the spirit and scope of the invention.

What is claimed is:

1. A process of abstracting file paths to locations of a plurality of design files in a computer readable language comprising:
   a) inputting at least one description file located on a system, wherein the description file defines the design files in a first environment;
   b) parsing a directory structure on the system to locate the description file and parsing the description file to identify file paths to the description file and each of the design files defined by the description file; and
   c) generating an index correlating each description file and its respective file path for the first environment,
   d) constructing a list containing design file names and respective full file paths for each of the design files in the first environment, wherein the respective full file paths are constructed by concatenating the file path of the description file that is identified in the index to the file path of the design file that is defined by the description file; and e) accessing at least one of the design files within the first environment by a design tool in a second environment through the respective full file path to the design file in the first environment, which was produced by concatenating in step d).

2. The process of claim 1, wherein step (b) comprises:

b1) defining a directory of description files defining file paths in the first environment, and b2) parsing the directory.

3. A process of applying a plurality of design files in a hardware description language to a second environment, comprising steps of:

a) accessing an index correlating a description file and its respective file path in a first, hardware description environment, the description file defining file paths to the design files in the first, hardware description environment;

b) constructing a list containing design file names and respective full file paths for each of the design files, wherein the respective full file paths are constructed by concatenating the file path of the description file that is identified in the index to the file path of the design file that is defined by the description file; and c) accessing at least one of the design files within the first, hardware description environment by a design tool in the second environment through the respective full file path to the design file in the first, hardware description language environment, which was produced by concatenating in step b).

4. A computer readable storage medium having a computer readable program embodied therein comprising program code which, when executed by a computer, cause the computer to perform steps comprising:

inputting computer readable description files that define design files in a computer readable language in a first environment;

parsing a directory structure to locate the description files and parse the description files to identify file paths to the description files and each of the plurality of design files;

generating an index correlating each description file and its respective file path;

constructing a list containing design file names and respective full file paths for each of the design files in the first environment, wherein the respective full file paths are constructed by concatenating the file path of the description file that is identified in the index to the file path of the design file that is defined by the description file; and accessing at least one of the design files within the first environment by a design tool in a second environment through the respective full file path to the design file in the first environment, which was produced by concatenating in the step of constructing.

5. The computer usable medium of claim 4, wherein parsing the directory structure comprises:

defining a directory of description files, and parsing the directory.

\* \* \* \* \*